United States Patent
Niemitz et al.

(10) Patent No.: US 12,461,904 B2
(45) Date of Patent: Nov. 4, 2025

(54) DISTRIBUTED AGGREGATIONS IN BIGTABLE

(71) Applicant: Google LLC, Mountain View, CA (US)

(72) Inventors: Steven Niemitz, New York, NY (US); Thomas Robert Magrino, Mamaroneck, NY (US); Douglas Moore Mcerlean, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/626,721

(22) Filed: Apr. 4, 2024

(65) Prior Publication Data

US 2025/0315424 A1   Oct. 9, 2025

(51) Int. Cl.
*G06F 16/00* (2019.01)
*G06F 16/23* (2019.01)
*G06F 16/27* (2019.01)

(52) U.S. Cl.
CPC .......... *G06F 16/2358* (2019.01); *G06F 16/27* (2019.01)

(58) Field of Classification Search
CPC .............................. G06F 16/2358; G06F 16/27
See application file for complete search history.

(56) References Cited

U.S. PATENT DOCUMENTS

| | | | |
|---|---|---|---|
| 9,280,591 B1 | 3/2016 | Kharatishvili et al. | |
| 2017/0083535 A1* | 3/2017 | Marchukov | H04L 67/125 |
| 2020/0379775 A1* | 12/2020 | Kulkarni | G06F 16/00 |
| 2024/0354303 A1* | 10/2024 | Anand | G06F 16/244 |

FOREIGN PATENT DOCUMENTS

WO   2024020070 A1   1/2024

OTHER PUBLICATIONS

International Search Report and Written Opinion of International Application No. PCT/US2025/023026 dated Jul. 10, 2025, 11 pp.

* cited by examiner

*Primary Examiner* — Alexander Khong
(74) *Attorney, Agent, or Firm* — Shumaker & Sieffert, P.A.

(57) ABSTRACT

A method includes receiving, at a first node of a plurality of nodes of a distributed database, an update request for an aggregate value stored at the first node. The update request includes a first sequencer. Based on receiving the update request for the aggregate value, the method includes updating the aggregate value based on the update request, storing a log record of the update to a changelog, and transmitting the update request to each other node. After updating the aggregate value, the method includes receiving, from a second node, a reset request for the aggregate value. The reset request includes a second sequencer. The method includes determining that the reset request predates the update request. Based on determining that the reset request predates the update request, the method includes resetting the aggregate value and updating the aggregate value based on the update request.

20 Claims, 7 Drawing Sheets

DISTRIBUTED AGGREGATIONS IN BIGTABLE

TECHNICAL FIELD

This disclosure relates to distributed aggregations for distributed storage systems.

BACKGROUND

In the analytics space, users often want to quickly summarize or aggregate large amounts of raw data (e.g., counting, summing, etc.) for incoming data streams. For example, an analyst may want to count the number of views a web page has received or the number of unique users that visited. Conventionally, multi-master distributed storage systems allow users to modify stored aggregate values via append-like operations (e.g., increment a counter value, add a number to the current value, etc.).

SUMMARY

One aspect of the disclosure provides a computer-implemented method for distributed aggregations at distributed storage systems. The method, when executed by data processing hardware, causes the data processing hardware to perform operations. The operations include receiving, at a first node of a plurality of nodes of a distributed database, an update request for an aggregate value stored at the first node. The update request includes a first sequencer identifying a point in time when the update request was created. Based on receiving the update request for the aggregate value, the operations include updating the aggregate value based on the update request, storing a log record of the update to the aggregate value and the first sequencer to a changelog, and transmitting the update request to each other node of the plurality of nodes. After updating the aggregate value, the operations include receiving, from a second node of the plurality of nodes, a reset request for the aggregate value. The reset request includes a second sequencer identifying a point in time when the reset request was created. The operations also include determining, using the changelog and the second sequencer, that the reset request predates the update request. Based on determining that the reset request predates the update request, the operations include resetting the aggregate value stored at the first node and, after resetting the aggregate value, updating the aggregate value based on the update request.

Implementations of the disclosure may include one or more of the following optional features. In some implementations, the distributed database includes a memtable layer stored at volatile memory of the data processing hardware and at least one sstable layer stored at one or more persistent disks of the data processing hardware. In some of these implementations, periodically data stored at the memtable layer is compacted to one of the at least one sstable layer.

In some examples, the operations further include determining a starting low watermark representing a sequencer boundary for updates to the aggregate value in a lower layer of the distributed database and determining a final low watermark representing a sequencer boundary for updates to the aggregate value in a current layer or a lower layer of the distributed database. In some of these examples, the operations further include deleting one or more log records from the changelog based on the starting low watermark and the final low watermark. Deleting the one or more log records from the changelog may include determining that the one or more log records are each associated with a sequencer that is less than the final low watermark and greater than the starting low watermark.

Optionally, the changelog includes a resolved accumulation representing a sum of all resolved updates, a current accumulation representing a sum of all updates received by the first node, and a sequencer of a most recent reset request. A respective update is resolved when a reset request cannot cause the respective update to be replayed. The current accumulation may be equal to a sum of the resolved accumulation and all updates stored at the changelog.

In some implementations, the changelog includes a set of sequencers and each sequencer in the set of sequencers is associated with a respective node in the plurality of nodes. Additionally, the starting low watermark may include the lowest sequencer of the set of sequencers. Additionally or alternatively, the final low watermark includes the highest sequencer of the set of sequencers.

Another aspect of the disclosure provides a system for distributed aggregations at distributed storage systems. The system includes data processing hardware and memory hardware in communication with the data processing hardware. The memory hardware stores instructions that when executed on the data processing hardware cause the data processing hardware to perform operations. The operations include receiving, at a first node of a plurality of nodes of a distributed database, an update request for an aggregate value stored at the first node. The update request includes a first sequencer identifying a point in time when the update request was created. Based on receiving the update request for the aggregate value, the operations include updating the aggregate value based on the update request, storing a log record of the update to the aggregate value and the first sequencer to a changelog, and transmitting the update request to each other node of the plurality of nodes. After updating the aggregate value, the operations include receiving, from a second node of the plurality of nodes, a reset request for the aggregate value. The reset request includes a second sequencer identifying a point in time when the reset request was created. The operations also include determining, using the changelog and the second sequencer, that the reset request predates the update request. Based on determining that the reset request predates the update request, the operations include resetting the aggregate value stored at the first node and, after resetting the aggregate value, updating the aggregate value based on the update request This aspect may include one or more of the following optional features. Implementations of the disclosure may include one or more of the following optional features. In some implementations, the distributed database includes a memtable layer stored at volatile memory of the data processing hardware and at least one sstable layer stored at one or more persistent disks of the data processing hardware. In some of these implementations, periodically data stored at the memtable layer is compacted to one of the at least one sstable layer.

In some examples, the operations further include determining a starting low watermark representing a sequencer boundary for updates to the aggregate value in a lower layer of the distributed database and determining a final low watermark representing a sequencer boundary for updates to the aggregate value in a current layer or a lower layer of the distributed database. In some of these examples, the operations further include deleting one or more log records from the changelog based on the starting low watermark and the final low watermark. Deleting the one or more log records from the changelog may include determining that the one or more log records are each associated with a sequencer that is less than the final low watermark and greater than the starting low watermark.

Optionally, the changelog includes a resolved accumulation representing a sum of all resolved updates, a current accumulation representing a sum of all updates received by the first node, and a sequencer of a most recent reset request. A respective update is resolved when a reset request cannot cause the respective update to be replayed. The current accumulation may be equal to a sum of the resolved accumulation and all updates stored at the changelog.

In some implementations, the changelog includes a set of sequencers and each sequencer in the set of sequencers is associated with a respective node in the plurality of nodes. Additionally, the starting low watermark may include the lowest sequencer of the set of sequencers. Additionally or alternatively, the final low watermark includes the highest sequencer of the set of sequencers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
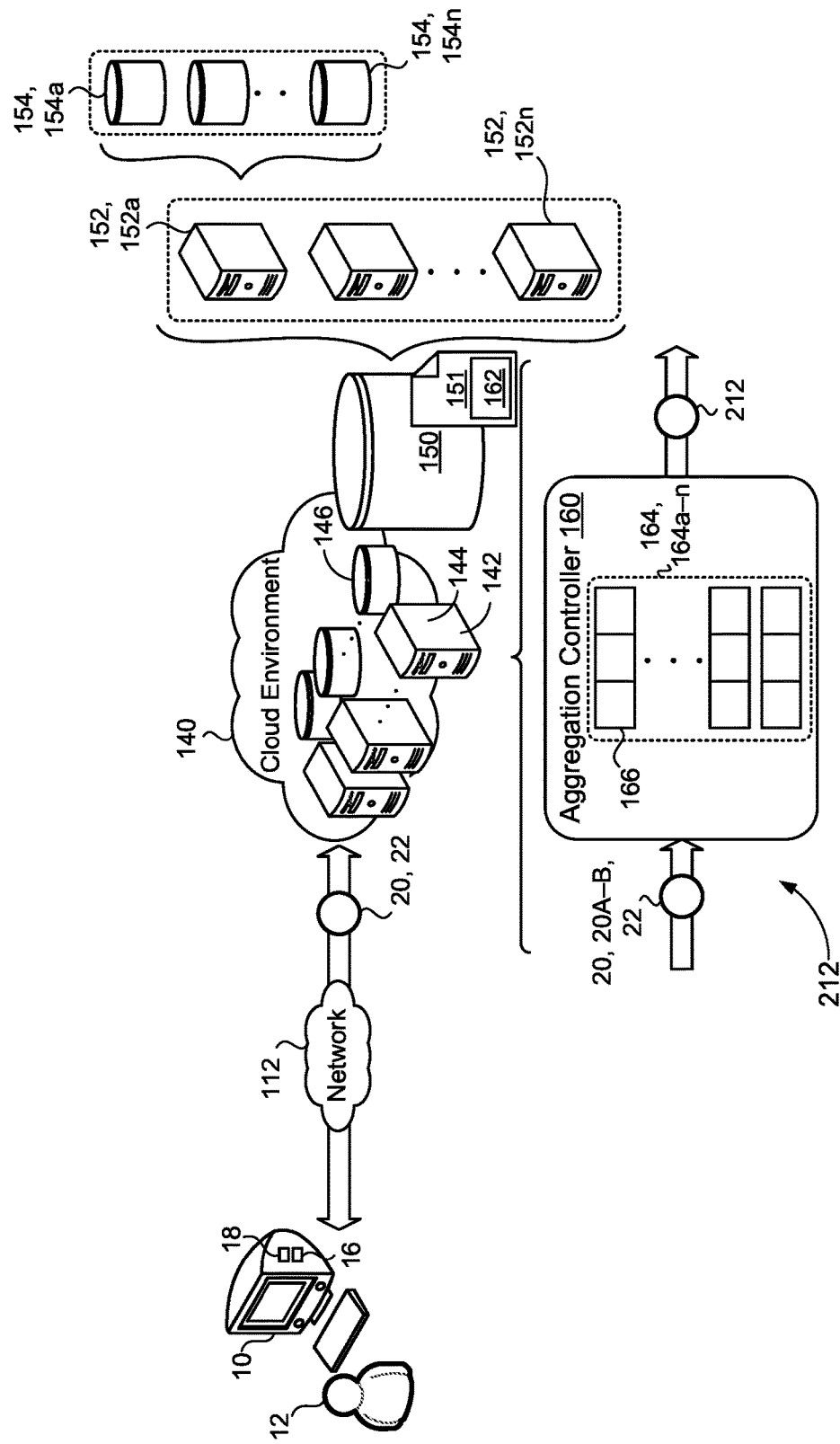
FIG. 1 is a schematic view of an example system for distributed aggregations for distributed storage systems.

In the analytics space, users often want to quickly summarize or aggregate large amounts of raw data (e.g., counting, summing, etc.) for incoming data streams. For example, an analyst may want to count the number of views a web page has received or the number of unique users that visited. Conventionally, multi-master distributed storage systems (i.e., systems that where more than one server or node or tablet is able to accept reads and writes for a given row) allow users to modify stored aggregate values via append-like operations (e.g., increment a counter value, add a number to the current value, etc.). However, these systems typically do not allow users to reset or clear the currently stored value in a consistent manner (e.g., set the counter value to zero).

This problem is difficult because replicas cannot simply apply a delete operation in the order it is received, as other replicas may have received other aggregate operations in a different order from when those replicas receive the delete via replication. For example, if a first node receives a reset request (e.g., a request to reset the value to zero) and then resets the value, a second node may receive an increment request and increment the value before receiving the reset request (e.g., due to replication delay). In this example, the second node may increment the value then reset, ending with a value of zero while the first node may reset and then increment, ending with a value of one, causing the replications to be inconsistent.

Implementations herein provide an aggregation controller that allows for aggregation of values in a multi-master distributed database system that uses a log-structured merge-tree (LSM tree) architecture. The aggregation controller allows the aggregate values to be reset in a consistent way without incurring a substantial computational resource cost. The aggregation controller uses a combination of changelogs and replication watermarks. For example, incoming mutations or updates for aggregate values are appended to a changelog which may be used to "replay" in case a delete or reset request from another replica is pulled.

Using replication watermarks, the aggregation controller can continuously compact and trim entries from the changelog that are confirmed no longer needed to rebuild the state in case of delete requests, which limits the amount of state stored in the changelog to the amount of time the replicas lag each other by (i.e., the replication delay). The aggregation controller accumulates entries from the changelog that are no longer needed into a resolved accumulator and removes the entries from the changelog via compaction. The changelog is bounded on two sides. On a first side are potential deletes that may be seen in lower layers (e.g., sstables) of the LSM tree. On a second side are deletes that may have been received by other replicas but not yet pulled. The changelog may be persisted to sstables in the LSM tree on minor compactions. The changelog may also be trimmed during minor compactions. When merging layers of the LSM tree, the aggregation controller may combine accumulators and changelogs, effectively compacting them.

Referring to FIG. 1, in some implementations, a distributed database system 100 includes a remote system 140 in communication with one or more user devices 10 via a network 112. The remote system 140 is a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 may be configured to store one or more databases 151 or tables (i.e., a cloud database).

The data store 150 may be distributed across a number of nodes 152, 152a-n (also referred to as tablet servers or just servers). The nodes may make up a multi-master configuration for replication. That is, each node 152 is a replica of each other node (i.e., stores the same data) and each node 152 may be updated by any other node 152. For example, when a request to modify a value arrives at a first node 152, the first node 152 modifies the value and the modification is replicated to the other nodes 152 (e.g., via a replication pull). This is in contrast to a primary replica configuration where only a single node (i.e., a primary node) may update other nodes.

In some implementations, the data store 150 maintains one or more distributed databases 151 using a log-structured merge-tree (LSM tree) architecture. An LSM tree is a data structure that efficiently stores key-value pairs for retrieval in storage systems using a combination of memory and persistent disk structures. LSM trees include multiple layers 154, 154*a-n* (also referred to as levels) with the first level stored at memory (i.e., a memtable) and subsequent layers stored at one or more persistent disks (i.e., sstables). Data from each layer is periodically compacted to a lower layer. Compaction generally creates fewer (but larger) files at the lower layer.

Figure 2:
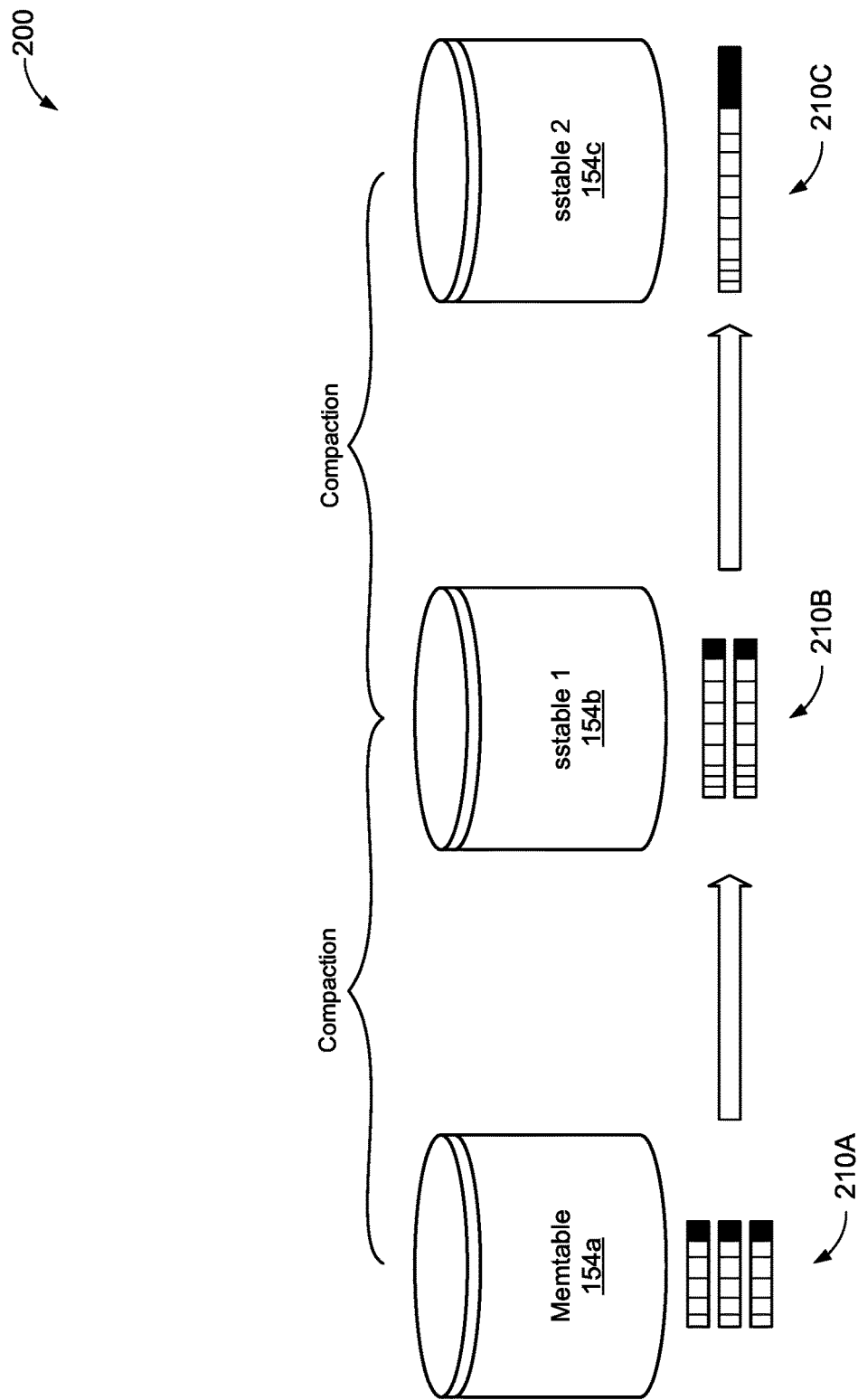
FIG. 2 is a schematic view of components of a database using a log-structured merge-tree (LSM tree) architecture.

Referring now to FIG. 2, a schematic view 200 includes exemplary components of a distributed database using an LSM tree architecture. Here, a first layer 154*a* of the LSM tree is a memtable. A second layer 154*b* of the LSM tree is an sstable 1 and a third layer 154*c* of the LSM tree is an sstable 2. The memtable 154*a* resides in volatile memory of the system the sstables 154*b-c* resides on one or more persistent disks (e.g., hard drives, solid state drives, etc.). During compaction, data 210A stored at the memtable 154*a* is compacted and stored at the sstable 1 154*b* and data 210B stored at the sstable 1 154*b* is compacted and stored at the sstable 2 154*c*. The distributed database may include any number of layers and, for example, data 210C stored at the sstable 2 may be further compacted to lower layers 154. While this architecture provides many benefits, leading to widespread use, it raises unique problems when contemplating an aggregation system. That is, in order to provide consistent resets (also referred to herein as deletes) of aggregates values, the compacted values of lower layers must also be accounted for.

For example, when a replica resets an aggregate value (i.e., in response to a reset request) and compacts the value after reset, the replica may subsequently receive an update for the aggregate value (e.g., to increment the value) that predates (i.e., occurred in time before) the reset request. This update should be ignored (because the delete occurs after the update), however in order to know this, the value would need to be read from the lower layer, which is inefficient. Instead, as described in more detail below, the system makes use of unresolved accumulations to avoid unnecessary reads of lower layers.

Referring back to FIG. 1, the remote system executes an aggregation controller 160. The aggregation controller 160 provides aggregation services for the distributed database 151 (e.g., allow users 12 to quickly summarize or aggregate large amounts of raw data via counting, summing, etc., incoming data streams). For example, the database 151 may include aggregate value 162 that is periodically updated by summing the current value with an update value. That is, the aggregation controller 160 receives requests 20 to modify the aggregate value 162, such as a request to increment the aggregate value 162. Although examples herein will focus on requests 20 that increment the aggregate value 162, the requests 20 may add or subtract any number from the aggregate value 162. The request 20 may include a modify request 20, 20A that increases or decreases the current value by an amount specified by the request 20A. Alternatively, the request 20 includes a reset request 20B (also referred to herein as a delete request 20B) that resets the aggregate value 162 to a default value (e.g., zero).

The requests 20 may originate from one or more users 12, from the remote system 140 (e.g., in response to data received at or generated by the remote system 140) or based on a data stream from a remote entity. For example, an update request 20A may originate from the remote system 140 when the remote system 140 determines that the aggregate value 162 should be updated based on data received by the remote system 140. In another example, the user 12 may send a reset request 20B to reset the aggregate value 162.

The aggregation controller 160 may be executed by each of the nodes 152 of the remote system 140. Alternatively or additionally, the aggregation controller 160 is executed by separate servers in communication with the nodes 152. In some examples, each node 152 executes a local aggregation controller 160 responsible for handling aggregation at that particular node 152. In other examples, a single aggregation controller 160 is responsible for aggregation of multiple nodes 152.

In some implementations, the aggregation controller 160 receives an update request 20A to update an aggregate value 162 stored at a database 151 of a first node 152 of the remote system 140. The update request 20A includes a sequencer 22 identifying a point in time when the reset request 20A was created and/or a general ordering of the reset request 20A with relation to other requests 20A. For example, a request 20 with a sequencer 22 of "50" indicates that the request 20 was created before a different request 20 with a sequencer 22 of "60" (i.e., because 50 is smaller than 60). The sequencer may take any form appropriate for determining a temporal order among different requests 20.

A plurality of nodes 152 each serve as a replica of the database 151 and/or aggregate value 162. Based on receiving the update request 20A, the first node 152 updates the local aggregate value 162 in accordance with the update request 20A (e.g., increments the aggregate value 162). The aggregation controller 160 stores a log record 166 of the update to the aggregate value 162 at a changelog 164. The log record 166 includes the sequencer 22 of the update request 20A. The update request 20A is also sent to the other nodes 152 of the distributed database 151 (e.g., via a replication push or a replication pull). The aggregation controller 160 may maintain a single changelog 164 or multiple changelogs 164, 164*a-n* (e.g., a changelog 164 per node 152, per layer 154, etc.).

After updating (e.g., incrementing) the aggregate value 162, the aggregation controller 160 may receive a reset request 20B for the aggregate value. The reset request 20B includes a sequencer 22 identifying a temporal order for the reset request 20B relative to the update request 20A. The aggregation controller 160 may determine, using the changelog 164, that the reset request 20B predates (i.e., was created before) the update request 20A. Because the reset request 20B predates the update request 20A, the aggregation controller 160 cannot simply reset the aggregate value 162, as then the modification of the aggregate value from the update request 20A is lost and inconsistencies between the nodes 152 may arise. Accordingly, the aggregation controller 160 resets the aggregate value 162 stored at the first node 152 and, after resetting the aggregate value, updates the aggregate value 162 based on the update request 20A. That is, the aggregation controller 160 resets the aggregate value 162 and then "replays" the update request 20A using the changelog 164. For example, when the update request 20A requests that the aggregate value 162 is incremented by one, the aggregation controller 160 first resets the aggregate value 162 (e.g., to zero) and then increments the aggregate value 162 by one.

If the aggregation controller 160 continually appended log records 166 to the changelog 164, the changelog 164 will eventually grow to a size that consumes too much computational resources to maintain. To compensate for this, the aggregation controller 160 may periodically trim or compact the changelog 164 to remote log records 166 that are no longer necessary for the changelog 164. In addition to this, the aggregation controller 160 must also account for requests 20 that have been compacted to lower layers 154 of the database 151. To this end, the aggregation controller 160 maintains watermarks that put bounds on the log records 166 stored within the changelog 164.

Figure 3:
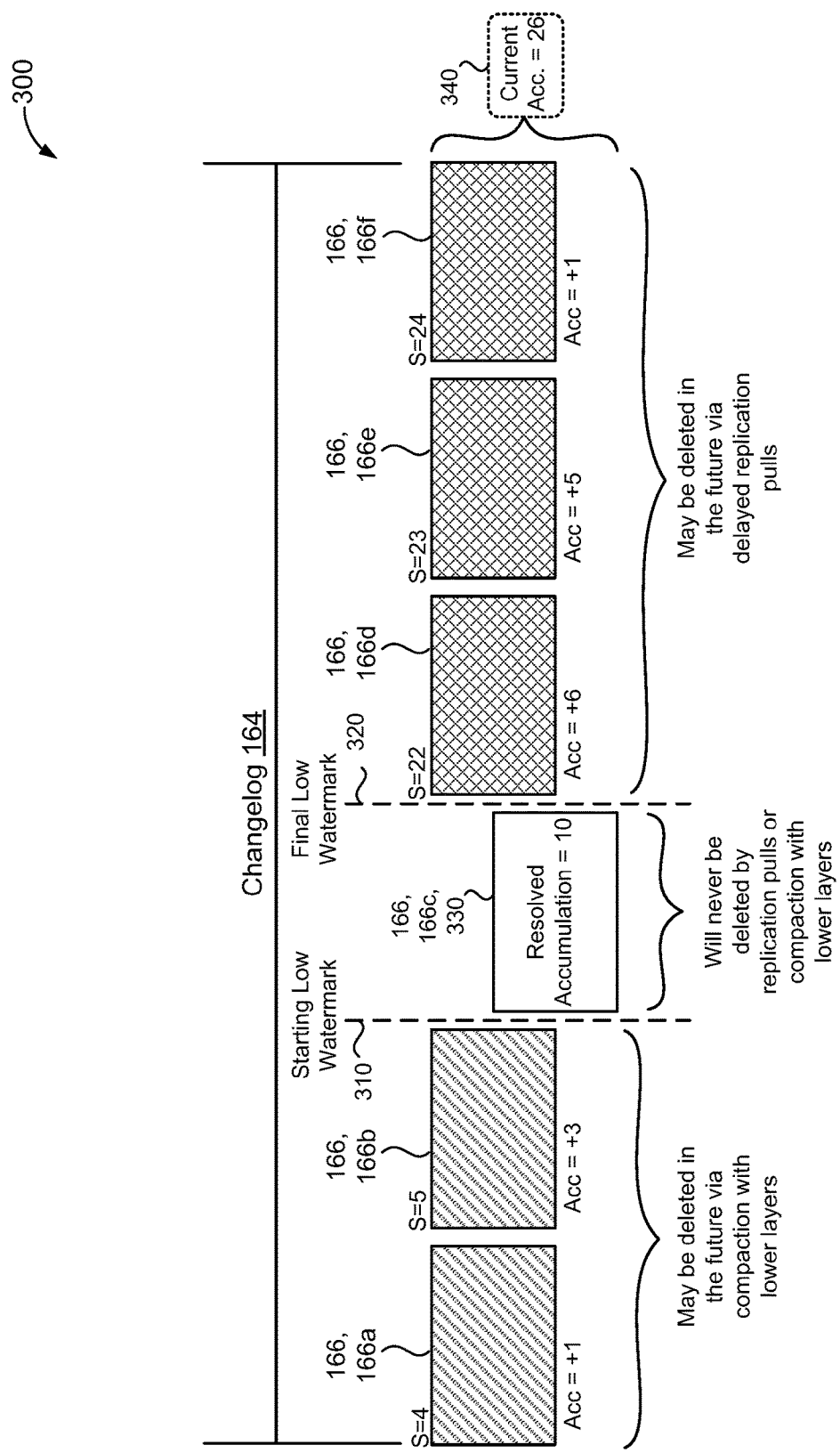
FIG. 3 is a schematic view of a changelog and watermarks for the system of FIG. 1.

Referring now to FIG. 3, a schematic view 300 illustrates an exemplary changelog 164. Here, the changelog 164 includes six log records 166, 166*a-f*. The aggregation controller 160 determines a starting low watermark 310 that represents a boundary for updates to the aggregate value 162 in a lower layer 154 of the distributed database 151. The aggregation controller 160 also determines a final low watermark 320 that represents a sequencer boundary for updates to the aggregate value 162 in a current layer 154 or a lower layer 154 of the distributed database 151. The aggregation controller 160 may compact and/or delete all log records 166 based on the watermarks 310, 320. Optionally, the aggregation controller 160 compacts or deletes all log records 166 that are between the watermarks 310, 320 into a resolved accumulation 330. The aggregation controller 160, in some implementations, does not compact or delete log records 166 that, based on the respective sequencer 22, are older than the starting low watermark 310. The aggregation controller 160 may also not compact or delete log records 166 that, based on the respective sequencer 22, are newer than the final low watermark 320.

In the example of FIG. 3, a first log record 166*a* has a sequencer 22 of '4' while a second log record 166*b* has a sequencer 22 of '5.' A third log record 166*c* includes the resolved accumulation 330 while the fourth through sixth log records 166*d-f* have sequencers 22 of "22," "23," and "24" respectively. In this particular example, the starting low watermark 310 is just after the second log record 166*b* (with a sequencer 22 of '5') and the final low watermark 320 is just before the fourth log record 166*d*. All log records 166 between the watermarks 310, 320 have been compacted into the resolved accumulation 330. To compact the log record, the aggregation controller 160 sums the modification of the log record 166 with the current resolved accumulation 330. For example, if the second log record 166*b*, which is associated with an accumulation of +3 were to be compacted into the resolved accumulation 330, the resolved accumulation 330 would update to a value of "13" (i.e., 10+3).

In some implementations, the aggregation controller 160 determines a current accumulation 340. The current accumulation may be a sum of the resolved accumulation 330 and the accumulations of each other log record 166 in the changelog 164. In the example of FIG. 3, the current accumulation 340 is equal to a value of "26" as this is the sum of 10 (i.e., the resolved accumulation 330) and the accumulation values associated with each of the other log records 166 (i.e., 1, 3, 6, 5, and 1, respectively). Optionally, the aggregation controller 160 additionally or alternatively stores a sequencer 22 associated with the last reset request 530 (FIG. 5) for the aggregate value 162. The resolved accumulation 330, the current accumulation 26, and/or the sequencer 22 of the last reset request 20A may be stored at the changelog 164 or otherwise be associated with the changelog 164.

The watermarks 310, 320 may be tracked on a per node 152 basis. That is, each respective node 152, in some examples, maintains a set of watermarks 310, 320 based on the perspective of that respective node 152. As an example, a cluster has a first node 152*a* (i.e., a first replica or 'A') and a second node 152*b* (i.e., a second replica or 'B'), and A has a current sequencer 22 of '5' and B has a current sequencer 22 of '6.' In this example, A has only pulled from B up to sequencer 22 '4' and B has pulled from A up to sequencer 22 '5.' Thus, here, from the perspective of A, its own watermark is '5' and B's watermark is 4 (i.e., {A=5, B=4}).

Thus, in this example, A maintains a starting low watermark 310 of '4' and a final low watermark 320 of '5.' Conversely, from B's point of view, the watermarks are {A=5, B=6}, so B maintains a starting low watermark 310 of '5' and a final low watermark 320 of '6.' Put another way, the changelog 164 (for each node 152 and/or each layer 154) includes or is associated with a set of sequencers 22, where each sequencer 22 in the set is associated with a respective node 152 and the starting low watermark 310 is the lowest sequencer 22 in the set of sequencers 22. Likewise, the final low watermark 320 is the highest sequencer 22 in the set of sequencers.

Figure 4:
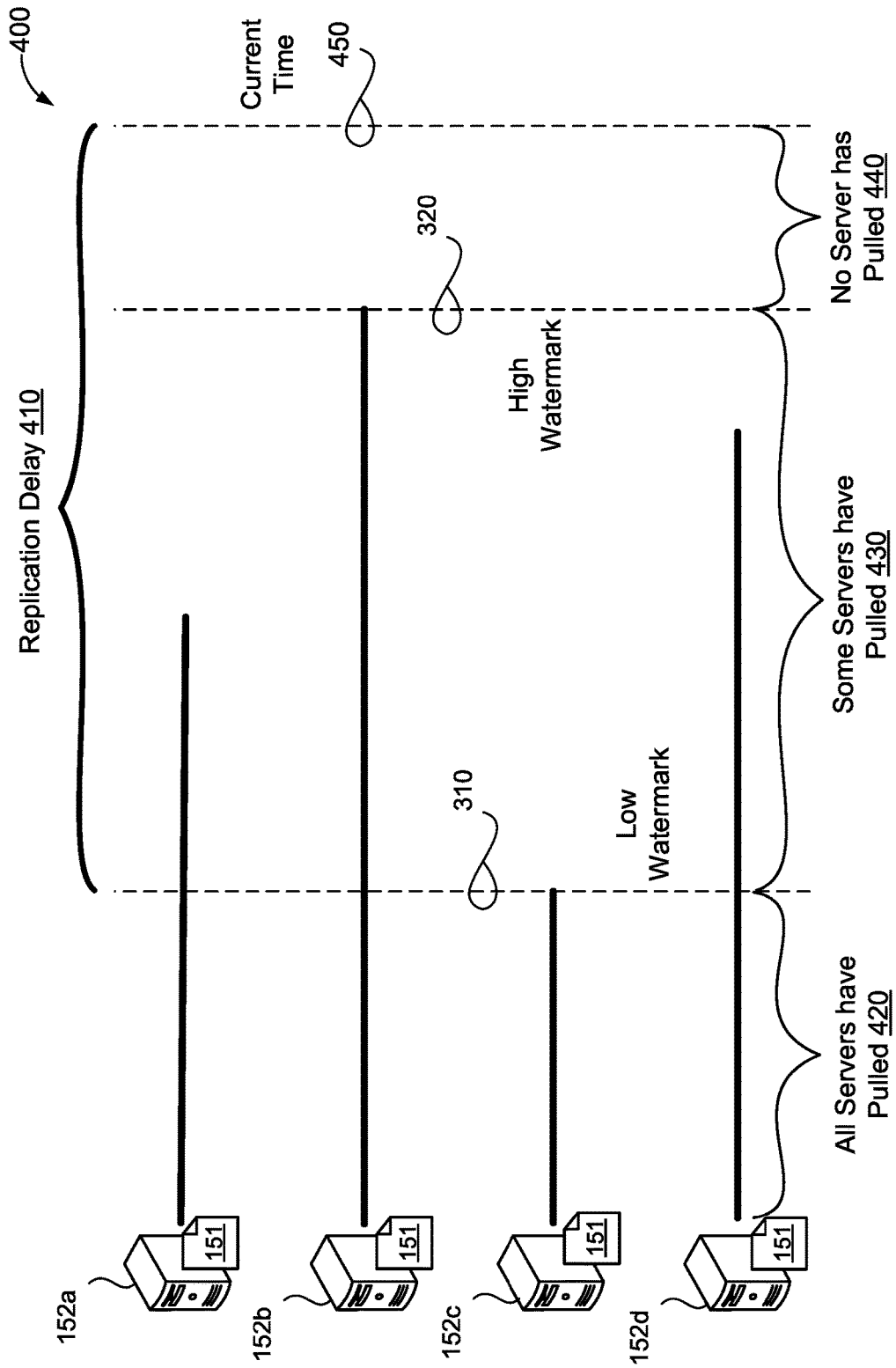
FIG. 4 is a schematic view of setting watermarks based on replication delay.

Referring now to FIG. 4, a schematic view 400 illustrates an example of replication delay 410 and its relation to the watermarks 310, 320. Here, there are four nodes 152*a-d* (or tablet server or server) that each maintain a replica of a database 151. Due to replication delay 410 (e.g., from network failures) the nodes 152*a-d* have different states based on what the nodes have pulled. A difference between the lowest sequencer 22 pulled by any of the nodes 152 (i.e., the starting low watermark 310) and the current time 450 represents the amount of replication delay 410 in the system. This can be divided into three distinct portions. A first portion 420 represents a period of time where all nodes 152 have pulled (i.e., before the low watermark 310), a second portion 430 represents a period of time where some nodes 152 have pulled and some nodes 152 have not pulled, and a third portion 440 represents a period of time when no nodes 152 have pulled.

Figure 5:
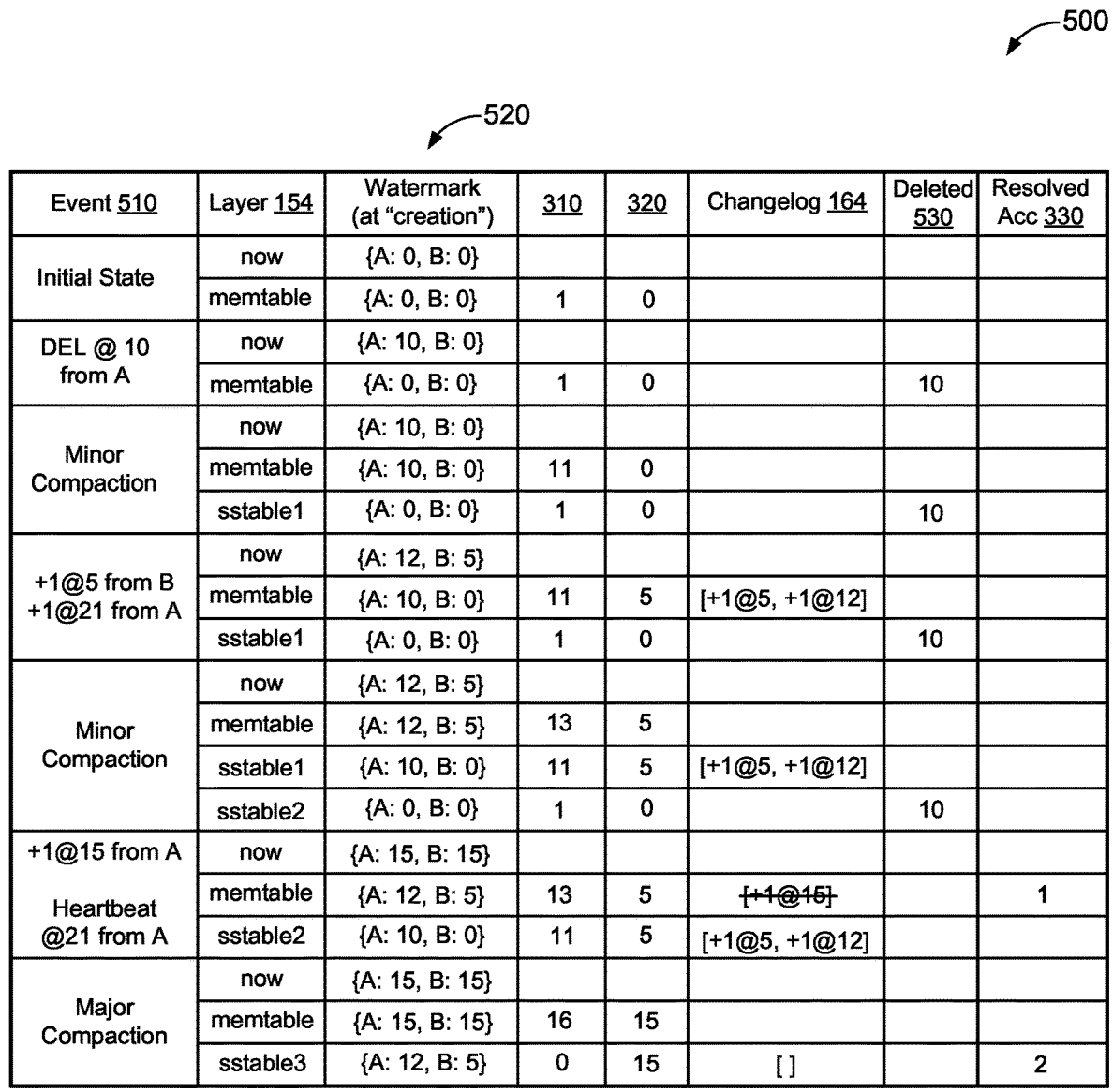
FIG. 5 is a table of example events in a distributed database.

Referring now to FIG. 5, a table 500 provides an illustrative example of events 510 (e.g., update requests 20A and reset requests 20B) and the effect these events 510 have on the watermarks 310, 320 of the layers 154 and the changelog 164. In this table 500, the events 510 begin with an initial state, and then include a reset request 20B (i.e., "DEL") at sequencer 22 '10' that originates from a node 152 'A.' The next event 510 includes a minor compaction, followed by an update request 20A at '5' from a node 152 'B' and an update request 20A at '21' from A. The next event 510 is another minor compaction followed by an update request 20A at '15' from A along with a heartbeat at '21' from A. The events 510 conclude with a major compaction. The table 500 details the watermarks 310, 320, the changelog 164, the last reset request 530 (i.e., "deleted") and the resolved accumulation 330 is for each layer 154 at each event 510. The events 510 are listed in the form of <operation>@<sequencer>from <source>.

Of note, the mutation for the "+1@5 from B +1@21 from A" event 510 must be recorded into the changelog 164 at the memtable layer 154 and not in the resolved accumulation 330 because the sequencers 22 of the event 510 are not greater than or equal to the starting low watermark 310 (i.e., "11") and less than or equal to the final low watermark 320 (i.e., '5'). That is, 11<=5<=5 is not true and likewise 11<=12<=5 is not true. Thus, in this example, the entry in the changelog 164 must be saved instead of being compacted into the resolved accumulation 330. Also of note, the starting low watermark 310 for the memtable layer 154 at the "+1@5 from B +1@21 from A" event 510 is "11" instead of "13" because the starting low watermark 310 may be determined from the bounds when the layer 154 was created. The mutation "+1@15" is dropped from the changelog 164 because the mutation is between the watermarks 310, 320 (i.e., 13<=15<=15). As shown at the sstable3 layer 154 of the major compaction event 510, the starting low watermark 310 may be reset to '0' during major compactions.

Thus, the aggregation controller uses replication watermarks 310, 320 to continuously compact and trim entries from changelogs that will not be needed to rebuild the state in case of resets or deletes, which limits the amount of state stored in the changelog to the amount of time the replicas lag each other by (i.e., the total replication delay). Entries that are not needed in the changelog are instead accumulated or compacted into a resolved accumulator. The changelog is bounded on two sides. On a first side are potential deletes that may be seen in lower layers (e.g., sstables) of the LSM tree, while on a second side, the changelog is bounded by deletes that may be received by other replicas not yet pulled. The changelog may be persisted to sstables in the LSM tree on minor compactions while simultaneously being trimmed. When merging layers of the LSM tree, the aggregation controller may combine accumulators and changelogs, effectively compacting them. Failure to trim the changelog causes the state of the system to be directly proportional to the number of updates performed and read and/or deletes become slower and slower to resolve.

Figure 6:
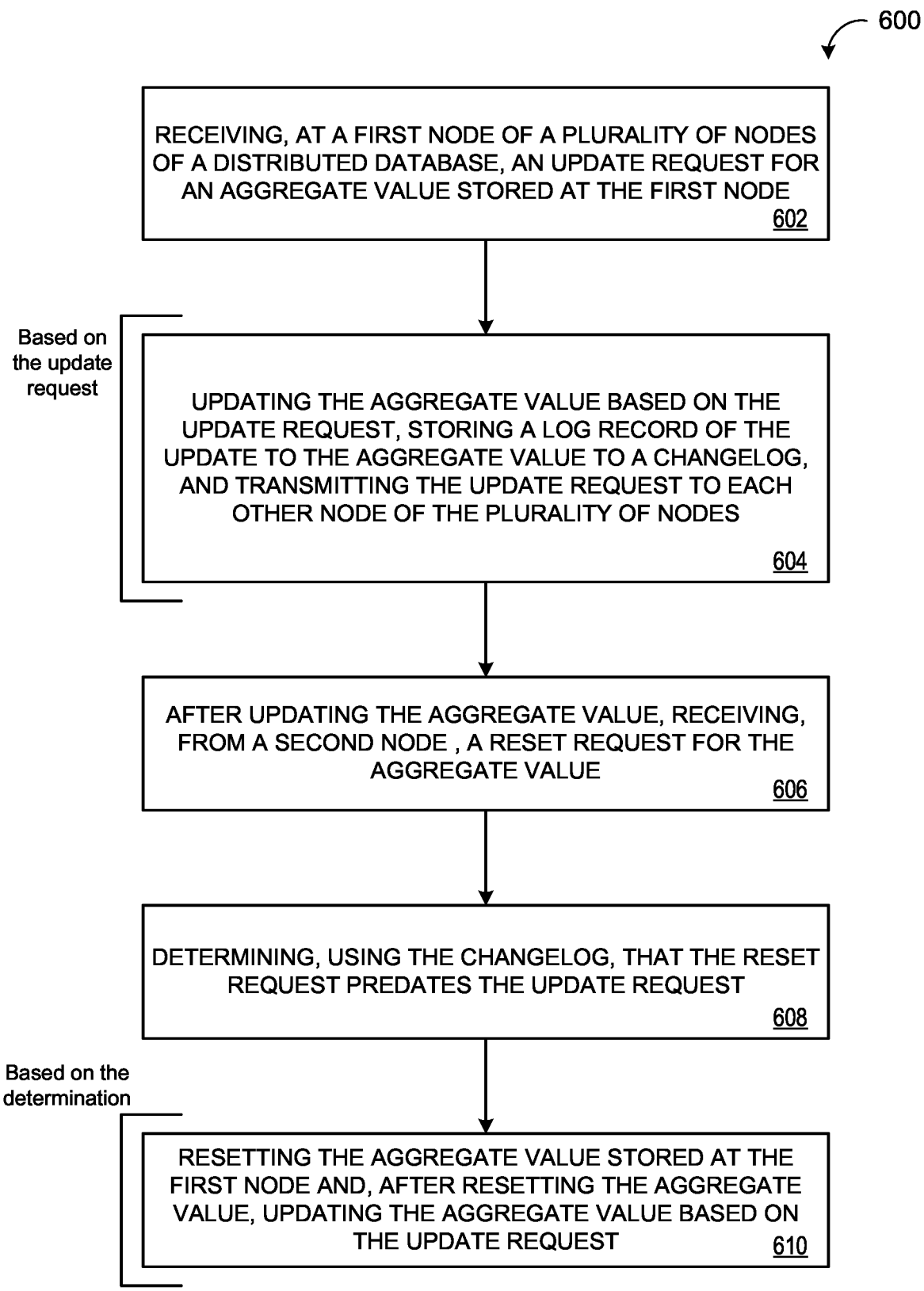
FIG. 6 is a flowchart of an example arrangement of operations for a method fir distributed aggregations in a distributed storage system.

FIG. 6 is a flowchart of an exemplary arrangement of operations for a method 600 for distributed aggregations at a distributed database system. The method 600 includes, at operation 602, receiving, at a first node 152 of a plurality of nodes 152 of a distributed database 151, an update request 20A for an aggregate value 162 stored at the first node 152. Each node 152 of the plurality of nodes 152 is a replica of each other node 152 and capable of receiving updates. The distributed database 151 uses a log-structured merge-tree architecture. The update request includes a first sequencer 22 identifying a point in time when the update request 20A was created.

At operation 604, the method 600 includes, based on receiving the update request 20A for the aggregate value 162, updating the aggregate value 162 based on the update request 20A; storing a log record 166 of the update to the aggregate value 162 and the first sequencer 22 to a changelog 164; and transmitting the update request 20A to each other node 152 of the plurality of nodes 152. The method 600, at operation 606, includes, after updating the aggregate value 162, receiving, from a second node 152 of the plurality of nodes 152, a reset request 20B for the aggregate value 162. The reset request 20B includes a second sequencer 22 identifying a point in time when the reset request 20B was created.

The method 600, at operation 608, includes determining, using the changelog 164 and the second sequencer 22, that the reset request 20B predates the update request 20A. At operation 610, the method 600 includes, based on determining that the reset request 20B predates the update request 20A, resetting the aggregate value 162 stored at the first node 152 and, after resetting the aggregate value 162, updating the aggregate value 162 based on the update request 20A.

Figure 7:
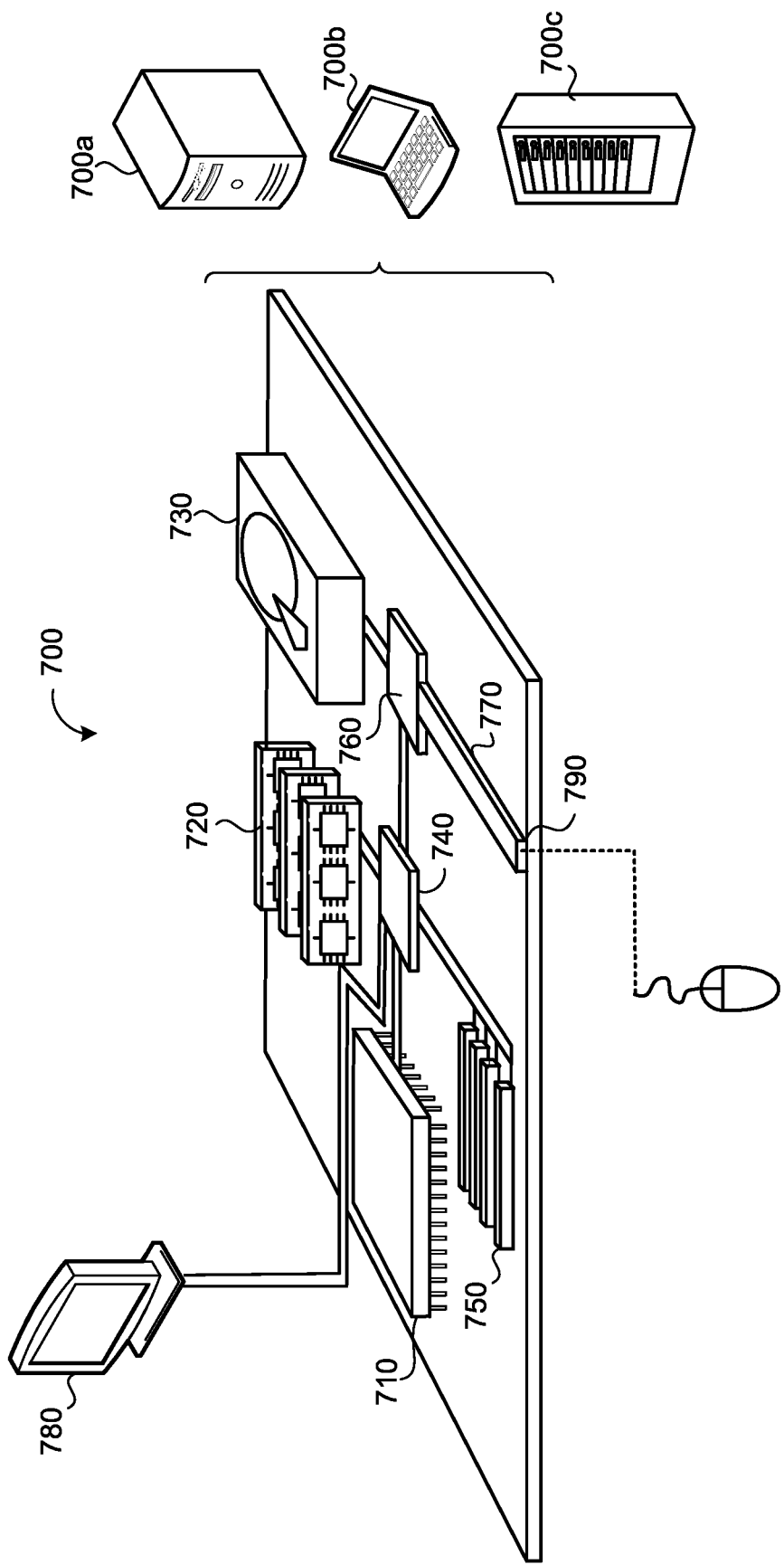
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving, by an aggregation controller and from a first node of a plurality of nodes of a distributed database, an update request for an aggregate value stored at the first node, the update request comprising a first sequencer identifying a point in time when the update request was created;
   responsive to receiving the update request for the aggregate value:
      causing, by the aggregation controller and based on the update request, the first node to update the aggregate value;
      storing, by the aggregation controller, a log record of the update to the aggregate value and the first sequencer to a changelog; and
      transmitting, by the aggregation controller and to each other node from the plurality of nodes, the update request;
   after the first node updates the aggregate value, receiving, by the aggregation controller and from a second node of the plurality of nodes, a reset request for the aggregate value, the reset request including a second sequencer identifying a point in time when the reset request was created;
   determining, by the aggregation controller and using the changelog and the second sequencer, that the reset request predates the update request; and
   responsive to determining that the reset request predates the update request, replaying the update request by at least:
      causing, by the aggregation controller, the first node to reset the aggregate value stored at the first node; and
      after the first node resets the aggregate value, causing, by the aggregation controller, the first node to update the aggregate value based on the update request.

2. The method of claim 1, wherein the distributed database comprises:

a log-structured merge-tree architecture;
a memtable layer stored at volatile memory of the aggregation controller; and
at least one sstable layer stored at one or more persistent disks of the data processing hardware.

3. The method of claim 2, further comprising:
periodically compacting, by the aggregations controller, data stored at the memtable layer to one of the at least one sstable layer.

4. The method of claim 2, further comprising:
determining a starting low watermark representing a sequencer boundary for updates to the aggregate value in a lower layer of the distributed database; and
determining a final low watermark representing a sequencer boundary for updates to the aggregate value in a current layer or a lower layer of the distributed database.

5. The method of claim 4, further comprising deleting one or more log records from the changelog based on the starting low watermark and the final low watermark.

6. The method of claim 5, wherein deleting the one or more log records from the changelog comprises determining that the one or more log records are each associated with a sequencer that is less than the final low watermark and greater than the starting low watermark.

7. The method of claim 4, wherein the changelog comprises:
a resolved accumulation representing a sum of all resolved updates, wherein a respective update is resolved when a reset request cannot cause the respective update to be replayed;
a current accumulation representing a sum of all updates received by the first node; and
a sequencer of a most recent reset request.

8. The method of claim 7, wherein the current accumulation is equal to a sum of the resolved accumulation and all updates stored at the changelog.

9. The method of claim 4, wherein:
the changelog comprises a set of sequencers, each sequencer in the set of sequencers associated with a respective node in the plurality of nodes; and
the starting low watermark comprises the lowest sequencer of the set of sequencers.

10. The method of claim 4, wherein:
the changelog comprises a set of sequencers, each sequencer in the set of sequencers associated with a respective node in the plurality of nodes; and
the final low watermark comprises the highest sequencer of the set of sequencers.

11. A system comprising:
data processing hardware; and
memory hardware in communication with the data processing hardware, the memory hardware storing instructions that when executed on the data processing hardware cause the data processing hardware to:
receiving, from a first node of a plurality of nodes of a distributed database, an update request for an aggregate value stored at the first node, the update request comprising a first sequencer identifying a point in time when the update request was created;
responsive to receiving the update request for the aggregate value:
cause the first node to update the aggregate value based on the update request;
store a log record of the update to the aggregate value and the first sequencer to a changelog; and
transmit, to each other node from the plurality of nodes, the update request;
after the first node updates the aggregate value, receive, from a second node of the plurality of nodes, a reset request for the aggregate value, the reset request including a second sequencer identifying a point in time when the reset request was created;
determine, using the changelog and the second sequencer, that the reset request predates the update request; and
responsive to determining that the reset request predates the update request, replay the update request by at least:
causing the first node to reset the aggregate value stored at the first node; and
after the first node resets the aggregate value, cause the first node to update the aggregate value based on the update request.

12. The system of claim 11, wherein the distributed database comprises:
a log-structured merge-tree architecture;
a memtable layer stored at volatile memory of the data processing hardware; and
at least one sstable layer stored at one or more persistent disks of the data processing hardware.

13. The system of claim 12, wherein the instructions further cause the data processing hardware to periodically compact data stored at the memtable layer to one of the at least one sstable layer.

14. The system of claim 12, wherein the instructions further cause the data processing hardware to:
determine a starting low watermark representing a sequencer boundary for updates to the aggregate value in a lower layer of the distributed database; and
determine a final low watermark representing a sequencer boundary for updates to the aggregate value in a current layer or a lower layer of the distributed database.

15. The system of claim 14, wherein the instructions further cause the data processing hardware to delete one or more log records from the changelog based on the starting low watermark and the final low watermark.

16. The system of claim 15, wherein the instructions that cause the data processing hardware to delete the one or more log records from the changelog further cause the data processing hardware to determine that the one or more log records are each associated with a sequencer that is less than the final low watermark and greater than the starting low watermark.

17. The system of claim 14, wherein the changelog comprises:
a resolved accumulation representing a sum of all resolved updates, wherein a respective update is resolved when a reset request cannot cause the respective update to be replayed;
a current accumulation representing a sum of all updates received by the first node; and
a sequencer of a most recent reset request.

18. The system of claim 17, wherein the current accumulation is equal to a sum of the resolved accumulation and all updates stored at the changelog.

19. The system of claim 14, wherein:
the changelog comprises a set of sequencers, each sequencer in the set of sequencers associated with a respective node in the plurality of nodes; and
the starting low watermark comprises the lowest sequencer of the set of sequencers.

20. The system of claim 14, wherein:
the changelog comprises a set of sequencers, each sequencer in the set of sequencers associated with a respective node in the plurality of nodes; and
the final low watermark comprises the highest sequencer of the set of sequencers.

* * * * *